Feb. 19, 1924.
L. L. LIGHTFOOT
DEVICE FOR CLEANING SINKS
Filed Nov. 11, 1922
1,484,512
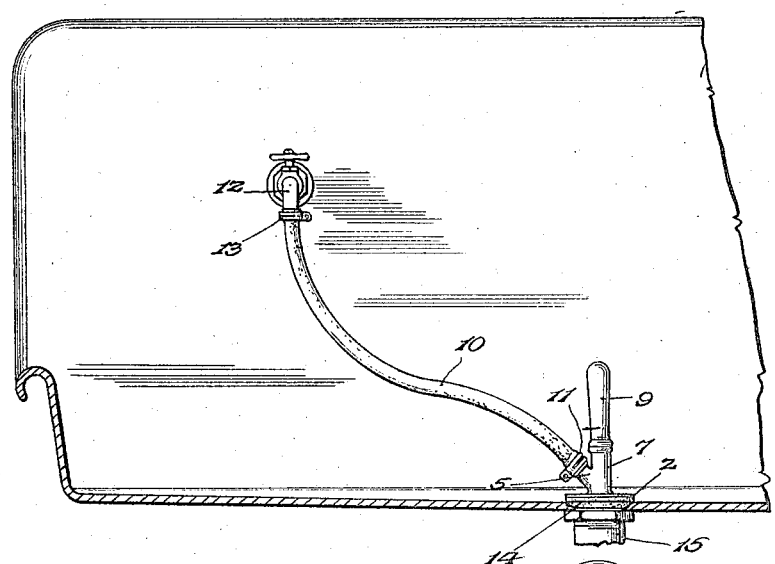
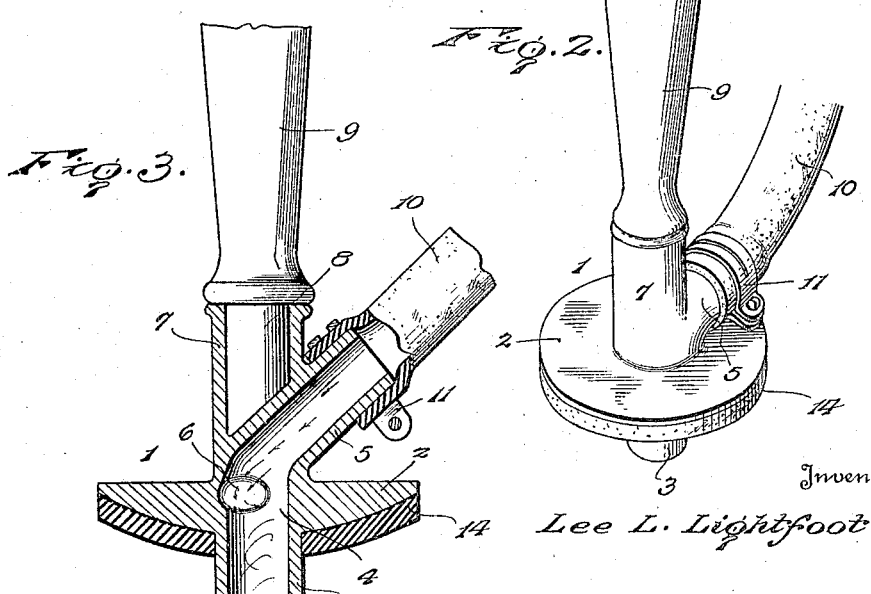
Inventor
Lee L. Lightfoot
By
Lacey & Lacey, Attorneys Patented Feb. 19, 1924.

1,484,512

UNITED STATES PATENT OFFICE.

LEE L. LIGHTFOOT, OF EAU CLAIRE, WISCONSIN.

DEVICE FOR CLEANING SINKS.

Application filed November 11, 1922. Serial No. 600,437.

*To all whom it may concern:*

Be it known that I, LEE L. LIGHTFOOT, a citizen of the United States, residing at Eau Claire, in the county of Eau Claire and State of Wisconsin, have invented certain new and useful Improvements in Devices for Cleaning Sinks, of which the following is a specification.

This invention has for its object the provision of a simple and inexpensive device which may be easily manipulated and by the use of which kitchen sinks and similar structures may be readily cleaned, a particular object of the invention being to provide a device by the use of which a forcible stream of water may be directed into the drain pipe of the sink so as to drive obstructions therefrom. The invention is illustrated in the accompanying drawings and will be hereinafter fully set forth.

In the drawing:

Figure 1 is a view, partly in elevation and partly in section, showing my device applied to a kitchen sink;

Fig. 2 is an enlarged perspective view of the device;

Fig. 3 is a sectional elevation of the same.

In carrying out my invention, I employ a body 1 which may be an integral casting and is of such form as to provide a disk-like head 2 having a convex under side and having a nozzle 3 depending centrally from said under side. The disk-like head 2 is centrally bored, as shown at 4, and the said bore forms a continuation of the bore of the nozzle. Above the head 2, the device is formed with an obliquely disposed tubular offset 5, the bore of which merges into the bore 4 of the head and at the junction of the tubular offset and the head a shallow cup-like cavity or recess 6 is formed in the inner surface of the bore of the head substantially in axial alinement with the bore of the tubular offset. A socket 7 rises from the offset 5 in axial alinement with the nozzle 3, and in the said socket is fitted a tenon 8 on the lower end of a handle 9, the tenon being held in the socket by friction or other means as is obvious. I also employ a hose or flexible pipe 10 which has one end secured about the end of the offset 5 in any preferred manner, as by a hose clamp 11, and the opposite end of this hose or flexible pipe 10 is adapted to be fitted about the end of the ordinary kitchen faucet 12 and secured thereto by a clamp 13 or otherwise. Upon the convex under side of the head 2, I secure a facing 14 of rubber or other flexible material so that, if the device be placed over the end of the drain pipe, indicated at 15, slight pressure exerted thereon through the handle 9 will effect a tight joint between the sink outlet and the head so that the entire stream of water flowing from the faucet will be directed into the drain pipe. A pressure will be thereby created through the drain pipe and the device which will aid in holding the device seated.

It will be readily understood that in the use of the device, the hose is fitted to the faucet 12 and the faucet opened so that water will flow in a strong stream through the hose 10. This stream of water will strike the recess or cavity 6 tangentially and will, consequently, be given a whirling motion which will cause it to act more powerfully upon any matter which may be lodged in the drain pipe. It will also be readily understood that, if the device be moved over the bottom of the sink while slightly spaced therefrom, all waste particles which may be upon the bottom of the sink will be washed to the outlet and into the drain pipe and the whirling motion imparted to the stream by its impact with the recessed portion 6 will aid in quickly loosening any greasy or sticky particles which might otherwise tend to adhere to the sink. The device is very simple and light and may be easily manipulated through the handle 9 so that it may be moved readily over the surface to be cleaned and when fitted in the end of the drain pipe slight pressure exerted thereon will hold it seated. Inasmuch as the stream of water flows across the axis of the handle and downwardly therefrom, a very slight pressure will suffice to overcome the re-action of the water and maintain the device seated in the end of the drain pipe. Ordinarily, the water which is permitted to run into a sink scatters over the bottom of the same and, consequently, loses its force by the time it enters the drain pipe so that it has no power to dislodge obstructions and clear the pipe, but with my present device the full pressure of the water is utilized as well as a rotating force imparted thereto so that a badly choked drain will be quickly cleared. When the use of the device is not needed, the hose may, of course, be readily detached from the faucet and the device put to one side.

Having thus described the invention, what is claimed as new is:

A device of the class described comprising a tubular elbow having a bore of uniform diameter, one end of which forming a nozzle and the other end a hose receiving shank; a cup-like cavity being formed in said bore in substantially axial alinement with said shank, means for attaching a handle to said shank, a disk-shaped head integral with and surrounding the elbow between the end of the nozzle and the bend of the elbow, said head having a flat upper surface and a convex bottom surface, and a packing of flexible material secured to said convex surface.

In testimony whereof I affix my signature.

LEE L. LIGHTFOOT. [L. S.]